Figure 1:
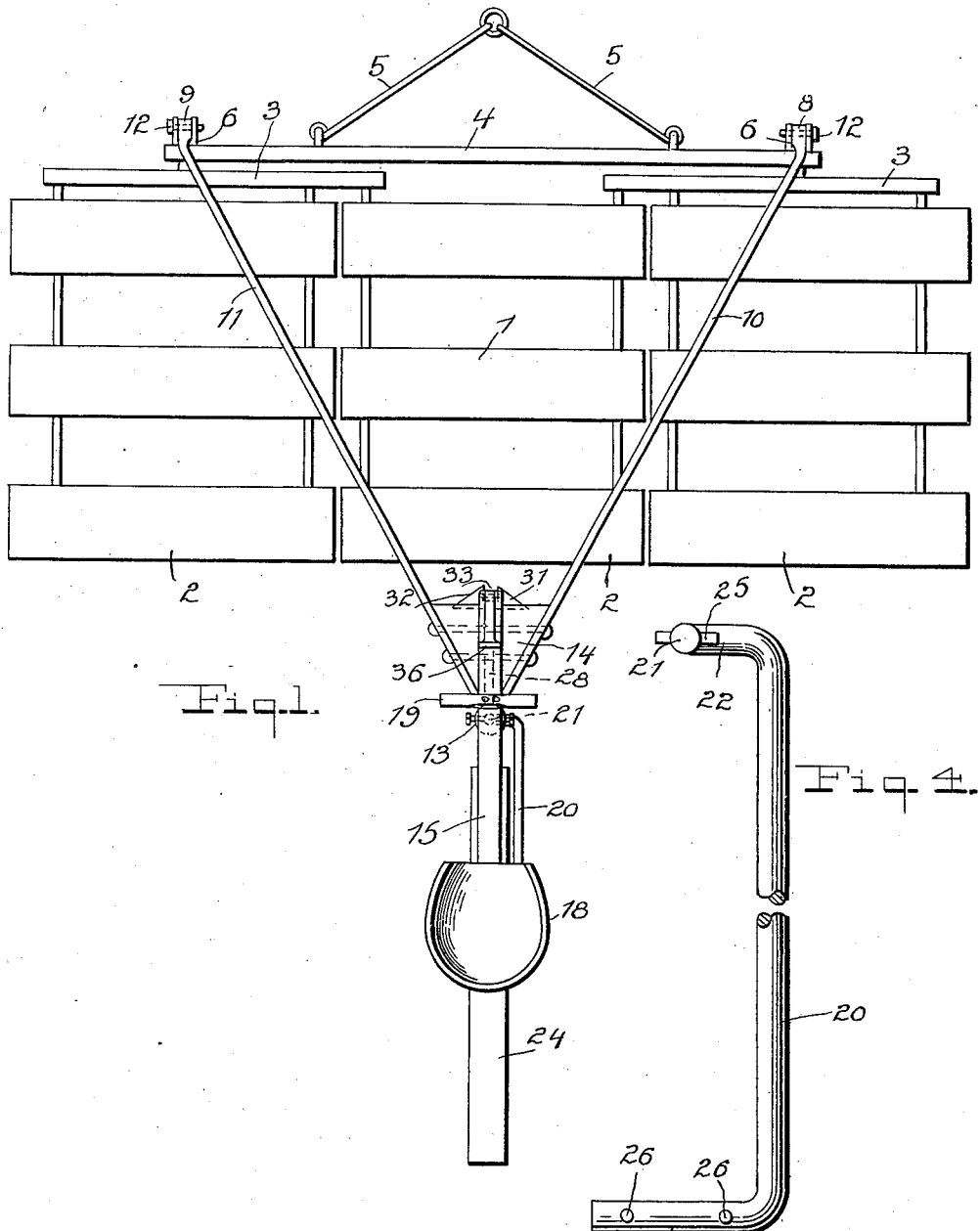

J. A. JANUS.
DRAG ATTACHMENT.
APPLICATION FILED JAN. 17, 1913.

1,085,737.

Patented Feb. 3, 1914.
2 SHEETS—SHEET 1.

J. A. JANUS.
DRAG ATTACHMENT.
APPLICATION FILED JAN. 17, 1913.
1,085,737.
Patented Feb. 3, 1914.
2 SHEETS—SHEET 2.
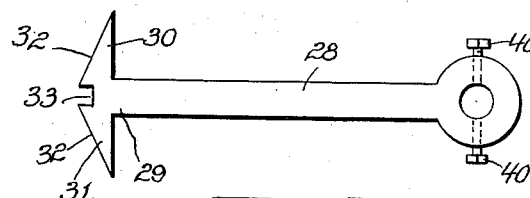
Fig. 2.
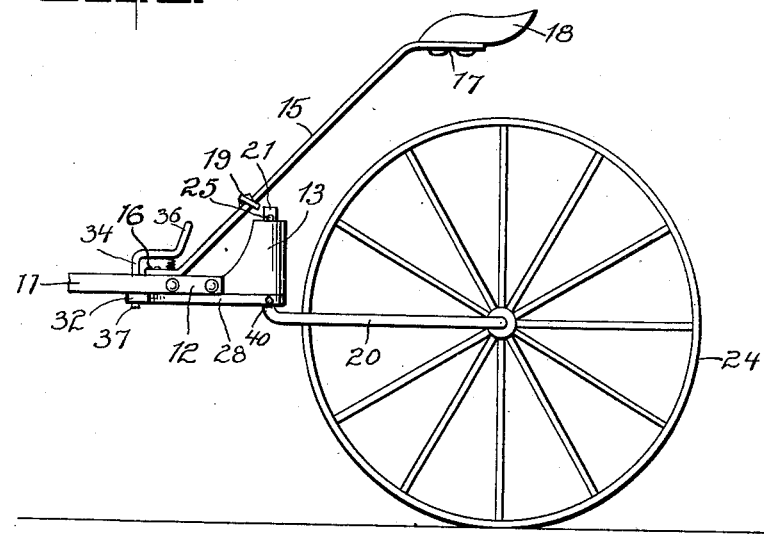
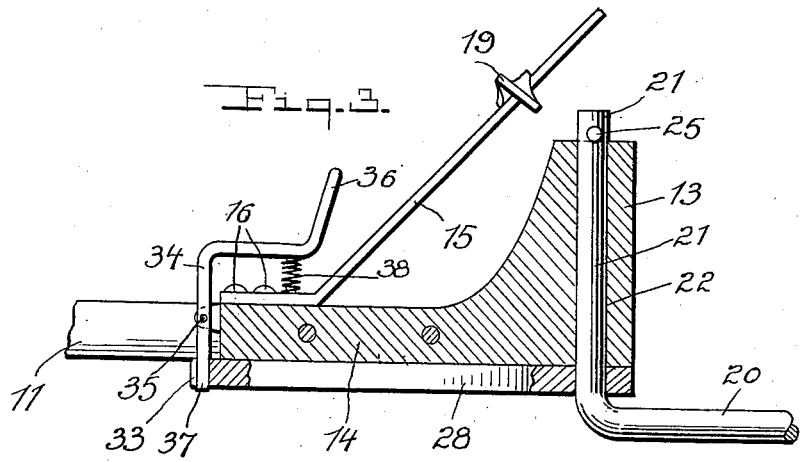
WITNESSES:
INVENTOR
John A. Janus,
BY
his ATTORNEY

UNITED STATES PATENT OFFICE.

JOHN A. JANUS, OF ORD, NEBRASKA.

DRAG ATTACHMENT.

1,085,737.  Specification of Letters Patent.  Patented Feb. 3, 1914.

Application filed January 17, 1913. Serial No. 742,682.

*To all whom it may concern:*

Be it known that I, JOHN A. JANUS, a citizen of the United States, residing at Ord, in the county of Valley and State of Nebraska, have invented new and useful Improvements in Drag Attachments, of which the following is a specification.

This invention relates to an attachment for agricultural implements and more particularly to a seat or cart attachment for a drag, harrow or the like.

The primary object of this invention is to eliminate much unnecessary labor on the part of the man preparing the soil without greatly increasing that of the horses.

Another object of this invention is to provide a seat upon which the driver may ride while breaking the soil, which is mounted upon the drag in such a manner that the majority of the weight of the driver is carried by a wheel above which the seat is suspended.

A further object of this invention is the provision of means for locking the wheel in a rigid position while the drag is traveling straight and a convenient and efficient means for releasing the wheel when it is desired to turn the drag and which will automatically re-lock the wheel when it again assumes a straight position.

Among the many other objects of this invention are: the provision of a novel and efficient, as well as cheap and durable axle upon which the wheel is mounted; an attachment which at the will of the operator may be removed or detached from the drag, harrow or the like with little exertion and a device which may be interchanged between a drag and a harrow or other similar implement; and one which owing to its extreme simplicity of construction will be reasonably cheap in manufacture.

With the foregoing and other objects in view, this invention consists in such details of construction, combination and arrangement of parts as will be hereinafter more fully described, illustrated in the accompanying drawings and claimed.

In describing the invention in detail, reference will be had to the accompanying drawings wherein like characters of reference designate like or corresponding parts throughout the several views, and in which:

Figure 1 is a top plan view of a drag showing the seat attachment attached thereto. Fig. 2 is a side elevation of the invention. Fig. 3 is a detail central longitudinal sectional view showing the means for locking and unlocking the wheel. Fig. 4 is a detail view of the shaft upon which the wheel is mounted, and Fig. 5 is a detail view of a part of the locking means.

In referring to the drawings by numeral, 1 designates a drag which is of the usual construction and is composed of a plurality of sections 2 which are connected together by means of the bars 3. A bar 4 having the rods 5 attached thereto is in turn connected to the bars 3 and has the substantially U-shaped metallic members 6 attached to each end thereof.

While the drag shown in the drawings and herein described is of a specific type it is to be understood that the attachment hereinafter described may be applied to any ordinary form of drag, harrow or other similar agricultural implement now in use.

Each of the substantially U-shaped members 6 is provided with openings near the upper ends of the leg portions thereof and has the enlarged ends 8 and 9 of the rods 10 and 11 respectively seated between its leg portions. The enlarged ends 8 and 9 of the rods 10 and 11 are also provided with an aperture extending therethrough which aperture is adapted to coincide with the apertures in the leg portions of the substantially U-shaped members 6 and pins 12 are inserted through these apertures and hold the rods 10 and 11 securely connected to the substantially U-shaped members 6 and to the drag 1. Secured to the other ends of the rods 10 and 11 is a bearing structure 13 which bearing structure 13 is peculiarly shaped as is shown in Figs. 2 and 3 of the drawings, the portion 14 of which is flat and has the bar 15 secured thereto by means of bolts or other suitable fastening means 16. The bar 15 extends upwardly at an angle from the portion 14 of the member 13 and has its upper end 17 bent at an angle so as to lie in a parallel plane with the portion 14 of the member 13 and the drag 1. A seat 18 of the type universally used upon agricultural implements is secured to the end 17 of the bar 15. Securely fastened to the bar 15 a short distance above the member 13 is a foot rest 19. A shaft 20 which has its inner end 21 bent upwardly and seated in the recess 22 in the bearing structure 13 has mounted on its outer end 23 which is bent at right angles to the main body portion and projects laterally therefrom a wheel 24. The end 21 of the shaft 20 is held in position in the recess 22 by means of a pin 25 and the wheel 24 is held on the end 23 by means of pins 26 one of which is placed upon each side of the hub of the wheel. Mounted upon the end 21 of the shaft 20 is a member 28 which has on its outer end 29 the projections 30 and 31. The outer edges of these projections 30 and 31 are inclined as is shown at 32. A notch or cut-out portion 33 is cut in the member 28 at the junction of the two projections 30 and 31. A lever 34 is pivoted at 35 between the two rods 10 and 11 and to the bearing structure 13. The upper end 36 of the lever 34 is bent so as to be easily engaged and operated by the foot of the operator, and the lower end 37 is seated in the notch or cut-out portion 33 when the lever 34 is in its normal position as is shown in Fig. 3 of the drawings. A spring 38 is interposed between the lever 34 and the member 13 and causes the end 37 of the pivoted lever 34 to automatically reseat itself in the notch whenever the wheel is in a straight position. The member 28 is securely fastened upon the end 21 of the shaft 20 by means of the set screws 40.

The pivoted lever 34 normally holds the wheel 24 rigidly in a straight position and when it is desired to turn the drag 1 and consequently the wheel 24 the operator presses his foot upon the end 36 of the lever 34 this forces the end 37 of the lever out of notch or cut-out portion 33 and releases the wheel which is allowed to turn correspondingly with the drag.

By securely locking the wheel 24 in a rigid position it is prevented from wabbling when striking large clods or the like and tends to make the movement of the drag more even and regular.

In practical fields, certain minor features of construction, combination and arrangement of parts may necessitate alterations to which the patentee is entitled provided such alterations are comprehended within the scope of what is claimed.

What is claimed as new and novel is:—

1. In a drag attachment, a bearing structure, rods connecting the same to a drag, a shaft having one end bent upwardly at an angle to the main body portion thereof and the other end extending laterally to the body portion, said upwardly bent end journaled in said bearing structure, a wheel mounted upon said laterally extending end and means for holding said shaft rigidly in said bearing structure.

2. In a drag attachment, a bearing structure, rods connecting the same to a drag, a shaft journaled in said bearing structure, a wheel carried by one end of said shaft, a member rigidly connected to said shaft and mounted adjacent the under surface of said bearing structure, and a lever pivotally connected to said bearing structure and having one end engaging said member for holding said shaft rigid in said bearing.

3. In a drag attachment, a bearing structure, rods connecting the same to a drag, a shaft having one end bent upwardly at an angle to the main body portion thereof, and the other end extending laterally to the body portion, said upwardly bent end journaled in said bearing structure, a wheel mounted upon said laterally extending end, a member rigidly connected to said shaft and mounted adjacent the under surface of said bearing structure, and a lever pivotally connected to said bearing structure and having one end in engagement with said member for holding said shaft rigidly in said bearing.

4. In a device as set forth, two rods connected to a drag, the free ends of said rods converging a bearing structure secured to said converging ends, a flat metal bar connected to said bearing structure and projecting upwardly therefrom, a seat secured to the upper end of said flat bar, a shaft having one end bent upwardly and at right angles to the main body portion thereof and the other end bent at right angles to said body portion and extending laterally therefrom, said vertically projecting end seated in said bearing structure and a wheel mounted upon the laterally extending angled end and means for securely locking or unlocking the said wheel in a rigid position.

5. In a device as set forth, two rods connected to a drag, the free ends of said rods converging, a bearing structure secured to said converging ends, a flat metal bar connected to said bearing structure and projecting upwardly therefrom, a seat secured to the upper end of said flat bar, a shaft having one end bent upwardly and at right angles to the main body portion thereof and the other end bent at right angles to said body portion and extending laterally therefrom, said vertically projecting end seated in said bearing structure and a wheel mounted upon the laterally extending angled end, a lever pivotally mounted upon said bearing structure and having its upper end bent in a manner so as to be advantageously engaged by a foot of a person, a member mounted adjacent the under surface of said bearing structure, one end of said member being enlarged so as to admit the vertical end of said shaft through an opening therein, the other end of said member provided with a cut-out portion therein said cut-out portion adapted to receive one end of said pivoted lever whereby said wheel will be held in a rigid position.

6. In a device as set forth, two rods connected to a drag, the free ends of said rods converging, a bearing structure secured to said converging ends, a flat metal bar connected to said bearing structure and projecting upwardly therefrom, a seat secured to the upper end of said flat bar, a shaft having one end bent upwardly and at right angles to the main body portion thereof and the other end bent at right angles to said body portion and extending laterally therefrom, said vertically projecting end seated in said bearing structure and a wheel mounted upon the laterally extending angled end, a lever pivotally mounted upon said bearing structure and having its upper end bent in a manner so as to be advantageously engaged by a foot of a person, a member mounted adjacent the under surface of said bearing structure, one end of said member being enlarged so as to admit the vertical end of said shaft through an opening therein, means for holding said shaft rigidly in said aperture whereby said member and said shaft will move in unison, the other end of said member provided with a cut-out portion therein said cut-out portion adapted to receive one end of said pivoted lever whereby said wheel will be held in a rigid position.

7. In a device as set forth, two rods connected to a drag, the free ends of said rods converging, a bearing structure secured to said converging ends, a flat metal bar connected to said bearing structure and projecting upwardly therefrom, a seat secured to the upper end of said flat bar, a shaft having one end bent upwardly and at right angles to the main body portion thereof and the other end bent at right angles to said body portion and extending laterally therefrom, said vertically projecting end seated in said bearing structure and a wheel mounted upon the laterally extending angled end, a lever pivotally mounted upon said bearing structure and having its upper end bent in a manner so as to be advantageously engaged by a foot of a person, a member mounted adjacent the under surface of said bearing structure, one end of said member being enlarged so as to admit the vertical end of said shaft through an opening therein, means for holding said shaft rigidly in said aperture whereby said member and said shaft will move in unison, the other end of said member provided with a cut-out portion therein said cut-out portion adapted to receive one end of said pivoted lever whereby said wheel will be held in a rigid position, and a spring interposed between said pivoted lever and said bearing structure whereby one end of said pivoted lever will automatically reseat itself in said cut-out portion.

JOHN A. JANUS.

Witnesses:
VINCENT KOKES,
JAMES C. WISDA.

---

Copies of this patent may be obtained for five cents each, by addressing the "Commissioner of Patents, Washington, D. C."